Sept. 9, 1958
A. R. MILLER
2,851,331
ELECTRO-DEPOSITED MOLD
Filed April 23, 1956
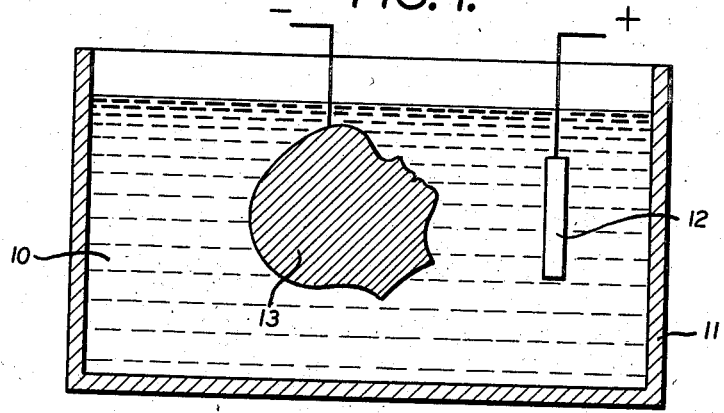
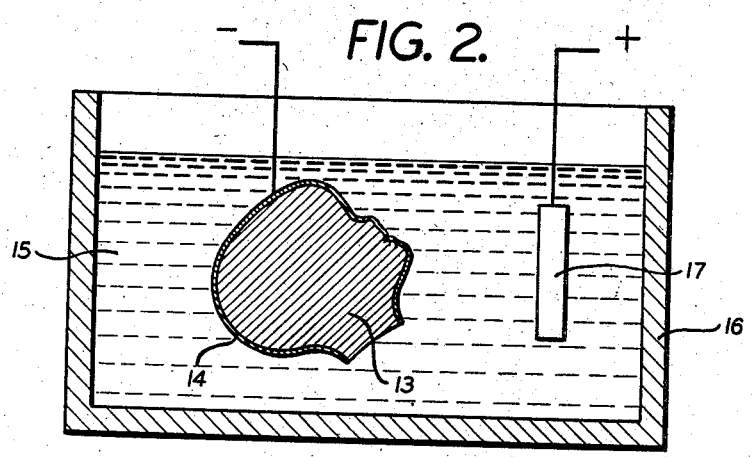
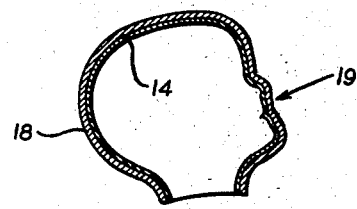
INVENTOR
ALVIN R. MILLER
BY
*Mocket Blum*
ATTORNEYS.

2,851,331
ELECTRO-DEPOSITED MOLD

Alvin R. Miller, Flushing, N. Y., assignor to Ideal Toy Corporation, Hollis, N. Y., a corporation of New York Application April 23, 1956, Serial No. 579,756

2 Claims. (Cl. 18—47)

My invention relates to a new and improved composite electro-deposited mold, for use in the plastisol molding process, and to an improved method of making such mold.

The improved hollow mold has an inner electro-deposited layer of copper, and an outer electro-deposited layer of bronze. These layers have an intimate electro-deposited bond at their contacting faces, due to the use of a special bath for electro-depositing the bronze alloy on the initial copper layer, so that the laminted wall of said mold has in effect, the same strength as an integral wall, with maximum heat transmission.

In the well-known plastisol molding process, a liquid and flowable plastisol molding composition is made, as by dispersing very fine particles of vinyl chloride polymer resin in a liquid plasticizer for said resin.

The plastisol molding composition is applied to the inner face of a mold, to provide a thin, coherent layer of said composition at said inner face. The mold is then heated to set this plastisol layer into final form.

This plastisol method has been extensively used in molding doll-heads and other parts of a doll-body.

The mold must have excellent heat conductivity; as otherwise the molding cycle is too long.

For this purpose, the mold has heretofore been made of copper.

Thus, in making a mold for molding a doll-head, a wax model of the head has been made. Copper has been electro-deposited upon this model in the well-known manner, using a conventional copper-plating bath in the well-known manner. The wax model has then been melted from the electro-deposited shell, which has been used as a mold in the plastisol process.

This shell must be thin, in addition to being made of metal of excellent heat conductivity, in order to provide maximum heat transmission, or else the period of the molding cycle is objectionably increased.

The thin copper mold has had a short life, because it is subjected to rough handling which dents the mold.

It has been proposed to electro-deposit a copper shell on the wax mold in the usual manner, and then to electro-deposit nickel on the outer face of the initial copper shell, thus providing a nickel-copper shell of superior strength. However, such a nickel-copper shell or mold has had low heat transmission in comparison to a one-piece copper shell or mold.

My invention will be further and more particularly described in conjunction with the annexed drawing, wherein:

Fig. 1 is a vertical section through a tank containing a copper plating bath and a copper anode for plating a wax model in accordance with the first step of my invention;

Fig. 1 is a view similar to Fig. 1, showing a further step of my invention. In this step, a wax model previously coated with copper, pursuant to the step of Fig 1, is placed in a bronze plating bath, still with a copper anode; and Fig. 3 is a vertical section through the completed mold.

According to one embodiment of my invention, I electro-deposit a thin copper shell 14 on the wax model 13, using any suitable copper-plating bath in the usual manner. The thickness of this initial copper shell 14 may be very small, such as 0.01 inch or about 0.25 millimeter. As shown in Fig. 1, the copper-plating bath 10 may be contained in a tank 11, with a copper anode 12 immersed in the bath. Fig. 1 shows the wax model 13 immersed in bath 10 prior to coating thereof. The wax model may be sensitized in the usual manner, so that it acts as a cathode.

I then electro-deposit bronze on the outer face of this initial copper shell 14, using said copper shell 14 as a cathode, while the initial copper shell 14 is still on the wax model 13. Fig 2 shows the wax model 13 with the initial, inner copper shell cathode 14 thereon, resulting from the step of Fig. 1, immersed in bronze plating bath 15 in tank 16. Only a single copper anode 17 is employed. I thus electro-deposit an outer bronze shell 18 (Fig. 3) on the initial, inner copper shell cathode 14. This outer bronze shell 18 may consist (by weight) of 88% of copper and 12% of tin. The thickness of this outer bronze shell 18 may be 0.125 inch or about three millimeters, so that the bronze shell 18 comprises the major part of the thickness of the bronze-copper mold or shell 19 (Fig. 3). The electro-deposited bronze shell is intimately bonded to the copper. The wall of this bronze-copper mold 19 is, in effect, a one-piece wall in providing resistance to denting. This bronze-copper mold has excellent heat conductivity, about equal to that of copper.

After both electro-deposits have been made, the wax model is removed by melting, in the usual manner.

It is well-known to electro-deposit a uniform alloy, by using a plurality of anodes, one anode for each metal of the alloy. This is unsatisfactory for the desired purpose herein, in which the bronze shell 18 must be intimately bonded by the electro-deposition thereof to the copper shell 14, for maximum strength and heat conductivity.

The special plating solution or bath 15 which I use for plating the bronze alloy to the copper shell is a known bath, but it is highly selective for the desired purpose.

The formula for the plating bath is stated below. The concentration of each solute is in ounces per gallon of the bath.

Potassium cyanide _____ 8.6
Copper cyanide (CuCN) _____ 3.8
Potassium hydroxide _____ 1.4
Potassium stannate, $K_2SnO_3.3H_2O$ _____ 4.7
Rochelle salt, potassium sodium tartrate _____ 6.0

Hence the bath has 24.5 ounces of total solutes per gallon.

This plating bath requires only a single copper anode.

The tin is supplied by the potassium stannate, which is added to the bath as required. This bath is kept at 145° F. to 160° F.

The current density at the initial copper shell cathode is 20 amperes to 100 amperes per square foot.

The current density at the copper anode is up to 20 amperes per square foot.

I thus provide a composite mold whose thickness is only about 0.135 inch or about 3.4 millimeters. The major part of the thickness of said mold is the strong bronze. In effect, the mold is made of bronze, save that it has an inner copper face.

I claim:

1. A copper-bronze mold for use in plastisol molding, said mold having an inner copper shell and an outer bronze shell integrally electro-deposited on said inner copper shell, the thickness of said outer bronze shell being a major part of the total thickness of said shell, the heat conductivity of said copper-bronze mold being substantially equal to the heat conductivity of copper, the thickness of said copper shell being substantially 0.01 inch, the thickness of said bronze shell being substantially 0.125 inch, said bronze shell consisting substantially by weight of 88% of copper and 12% of tin.

2. A method of making a mold for use in plastisol molding, said mold consisting of an inner copper shell which is integrally united at its outer face by electro-plating with an electro-plated outer bronze shell which covers the outer face of said inner copper shell, said outer bronze shell consisting by weight substantially of 88% of copper and 12% of tin; which consists in forming said inner copper shell by electro-deposition of copper upon the outer wall of a fusible base; and then electro-plating said outer bronze shell upon the outer wall of said inner copper shell to integrally unite said inner copper shell and said outer bronze shell at the outer wall of said inner copper shell; said outer bronze shell being electro-plated from a bronze plating bath while using said inner copper shell as the cathode and using only a copper anode in said bronze-plating bath; said outer bronze shell being electro-plated at substantially 145° F. to 160° F. at a current density of substantially 20 to 100 amperes per square foot; said bronze-plating bath having per gallon, substantially 8.6 ounces of potassium cyanide, substantially 3.8 ounces of copper cyanide, CuCN, substantially 1.4 ounces of potassium stannate, and substantially 6 ounces of Rochelle salt; renewing the potassium stannate in said bath as required during the electro-plating of the bronze shell to provide a bronze shell having said composition; electro-plating a bronze shell whose thickness is more than 50% of the total thickness of said mold; and then melting said fusible base from the interior of said copper shell, said copper shell being electro-plated to a thickness of substantially 0.01 inch, said bronze shell being electro-plated to a thickness of substantially 0.125 inch.

References Cited in the file of this patent
UNITED STATES PATENTS

| Number | Name | Date |
|---|---|---|
| Re. 13,988 | Eggers | Sept. 28, 1915 |
| 1,544,828 | Fuchs | July 7, 1925 |
| 1,868,788 | Zinser | July 26, 1932 |
| 2,204,263 | Thoresen | June 11, 1940 |
| 2,295,858 | McWane | Sept. 15, 1942 |
| 2,420,359 | Dasher | May 13, 1947 |
| 2,447,620 | Singleton et al. | Aug. 24, 1948 |